United States Patent
Hong et al.

(10) Patent No.: US 11,668,858 B2
(45) Date of Patent: Jun. 6, 2023

(54) ANTIREFLECTIVE LENS FOR INFRARED RAYS HAVING FOUR LAYERS OF SPECIFIED REFRACTIVE INDICES

(71) Applicants: Hyundai Motor Company, Seoul (KR); Kia Motors Corporation, Seoul (KR); Korea University Research and Business Foundation, Seoul (KR)

(72) Inventors: Seung Chan Hong, Gyeonggi-do (KR); Ill Joo Lee, Seoul (KR); Seungwoo Lee, Seoul (KR); Ji-hyeok Huh, Gyeonggi-do (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 233 days.

(21) Appl. No.: 16/993,562

(22) Filed: Aug. 14, 2020

(65) Prior Publication Data
US 2021/0173124 A1 Jun. 10, 2021

(30) Foreign Application Priority Data
Dec. 9, 2019 (KR) .......................... 10-2019-0162865

(51) Int. Cl.
*G02B 1/02* (2006.01)
*G02B 1/115* (2015.01)
(Continued)

(52) U.S. Cl.
CPC ................ *G02B 1/115* (2013.01); *G02B 1/02* (2013.01); *G02B 5/281* (2013.01); *G02B 1/002* (2013.01);
(Continued)

(58) Field of Classification Search
CPC . G02B 1/00; G02B 1/02; G02B 1/115; G02B 1/116; G02B 3/0037; G02B 5/281;
(Continued)

(56) References Cited

U.S. PATENT DOCUMENTS

| 4,057,316 A | 11/1977 | Hacman et al. |
| 10,254,445 B2 * | 4/2019 | Khan ..................... G02B 1/115 |
| 2010/0180941 A1 * | 7/2010 | Lim .................. H01L 31/02168 |
| | | 257/E31.127 |

FOREIGN PATENT DOCUMENTS

| CN | 108089244 A | 5/2018 |
| JP | H04136901 A | 5/1992 |

(Continued)

OTHER PUBLICATIONS

English translation of Liu et al., CN 108089244 A retrieved from https://worldwide.espacenet.com on Aug. 13, 2022 (Year: 2018).*

(Continued)

*Primary Examiner* — Ryan S Dunning
(74) *Attorney, Agent, or Firm* — Fox Rothschild LLP

(57) ABSTRACT

Disclosed are an antireflective lens for infrared rays that eliminates wavelengths in an infrared region to thus improve an antireflective effect and a method of manufacturing the same. The antireflective lens for infrared rays may be an antireflective lens used in an infrared band. The antireflective lens includes a lens base part including a base refractive material having a refractive index of about 3.0 or greater and an antireflective coating part formed on a front surface of the lens base part.

18 Claims, 12 Drawing Sheets

(51) Int. Cl.
    *G02B 5/28*         (2006.01)
    *G02B 13/14*       (2006.01)
    *G02B 1/00*         (2006.01)
    *G02B 1/116*       (2015.01)
    *G02B 3/00*         (2006.01)

(52) U.S. Cl.
    CPC ............ *G02B 1/116* (2013.01); *G02B 3/0037* (2013.01); *G02B 5/285* (2013.01); *G02B 13/14* (2013.01); *G02B 2207/101* (2013.01)

(58) Field of Classification Search
    CPC ... G02B 5/285; G02B 13/14; G02B 2207/101
    See application file for complete search history.

(56) References Cited

FOREIGN PATENT DOCUMENTS

| | | |
|---|---|---|
| JP | H08114701 A | 5/1996 |
| JP | 4763318 B2 | 6/2011 |
| KR | 10-2011-0118886 A | 11/2011 |
| KR | 10-2015-0126885 A | 11/2015 |
| WO | 2011086511 A1 | 7/2011 |

OTHER PUBLICATIONS

H.T. Chen et al., "Antireflection Coating Using Metamaterials and Identification of Its Mechanism", Physical Review Letters, vol. 105, pp. 073901-01-073901-04 (2010).

\* cited by examiner

-RELATED ART-

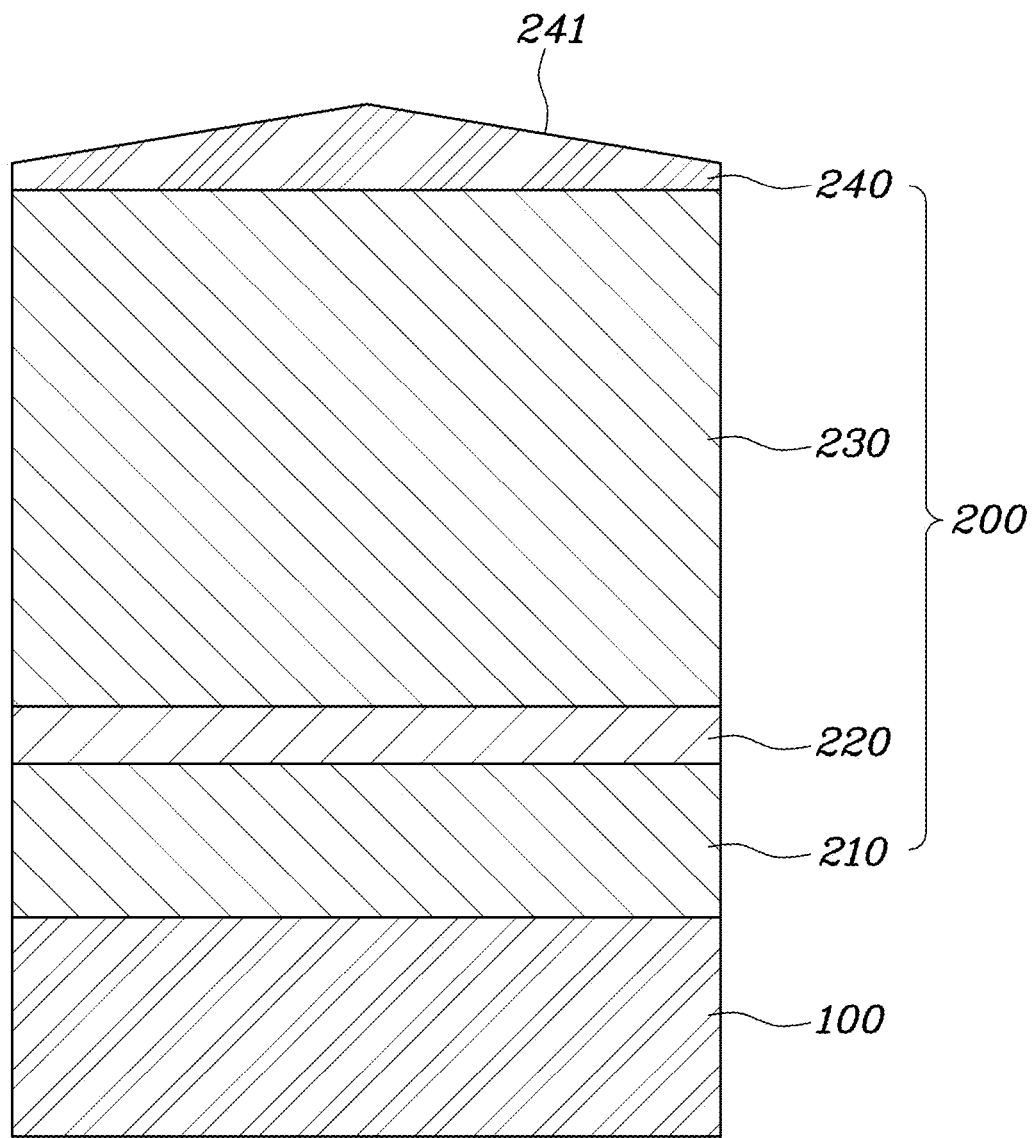

FIG. 3A
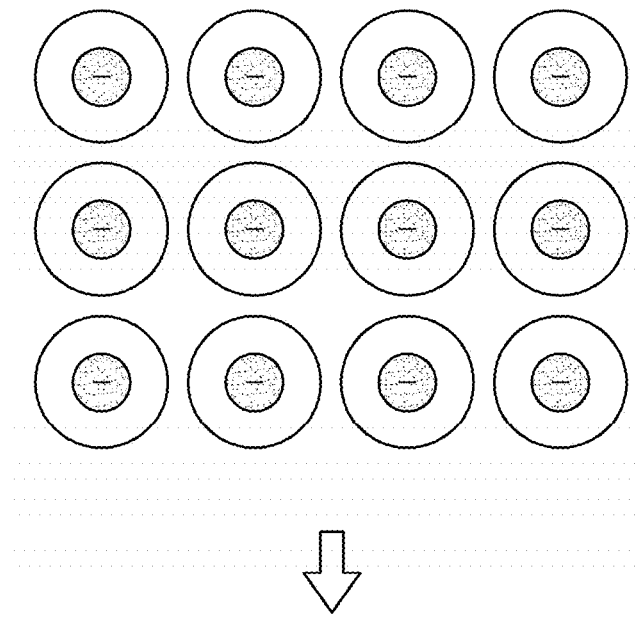
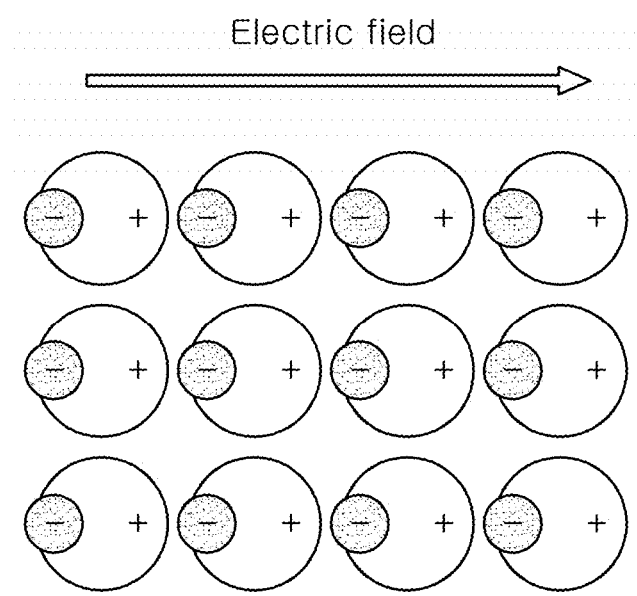
Electric field

ANTIREFLECTIVE LENS FOR INFRARED RAYS HAVING FOUR LAYERS OF SPECIFIED REFRACTIVE INDICES

CROSS REFERENCE TO RELATED APPLICATION

The present application claims priority to Korean Patent Application No. 10-2019-0162865, filed Dec. 9, 2019, the entire content of which is incorporated herein for all purposes by this reference.

TECHNICAL FIELD

The present invention relates to an antireflective lens for infrared rays. Particularly, the antireflective lens for infrared rays, may wavelengths in an infrared region to thus improve an antireflective effect.

BACKGROUND

An antireflective coating has been used to improve the transmittance of various optical elements such as lenses and optical filters.

When light is incident on a material having a high refractive index (glass, germanium, and the like, hereinafter referred to as 'medium') in the air, several to tens of percent of light is reflected at the interface between the air and the medium. In particular, the occurrence of reflection is increased as the refractive index of the medium is increased. Moreover, reflection and transmittance vary depending on the wavelength and angle of light incident on the medium. This phenomenon reduces the signal-to-noise ratio of the optical element using a medium having a high refractive index and causes an aberration in which the focus is changed depending on the incident wavelength and the incident angle, thereby impairing the performance of the optical equipment. Therefore, in order to solve the problems, a technique called antireflective coating has been applied to most optical elements.

The principle of the antireflective coating applied for this purpose will be described with reference to the drawings.

FIG. 1 shows an exemplary principle of antireflection in the related art. For example, the essential principle of antireflective coating is to induce destructive interference in the wavelengths hitting the lens and then reflected thereon. When a coating layer 2 is formed on the front surface of a lens 1, as shown in FIG. 1, a reflection occurs on the top and bottom of the coating layer 2 when light L is incident on the lens 1 from the outside. The reflected light beams R1 and R2 exhibit a phase difference of 180° with respect to the incident light. In general, the light R1 reflected from the top of the coating layer 2 and the light R2 reflected from the boundary surface of the bottom of the coating layer 2 after passing through the coating layer interfere with each other. When the coating layer is designed such that the wavelength of the light R1 reflected from the top of the coating layer 2 and the wavelength of the light R2 reflected from the boundary surface of the bottom of the coating layer 2 have a phase difference therebetween of half of the wavelength, whereby the wavelength of the light R1 reflected from the top of the coating layer 2 and the wavelength of the light R2 reflected from the boundary surface of the bottom of the coating layer 2 are subjected to destructive interference with each other, resulting in the disappearance of the reflected light.

The technique of forming the coating layer by applying the principle of the antireflective coating as described above may significantly improve the transmission performance of the lens. However, in the principle of antireflective coating, the coating design is performed for one wavelength, so applicability to a broadband spectrum is limited.

Therefore, currently, a multilayered structure including 2 to 3 layers or more is used in most antireflective coatings in order to overcome this limitation. For example, in order to broaden the range of antireflective wavelengths, a material having a high refractive index and a material having a low refractive index are repeatedly formed to manufacture an antireflective coating layer having a multilayered structure, or an intermediate layer is replaced by a gradient-refractive-index thin film having a refractive index gradient, the refractive index of which is continuously changed in a thickness direction, whereby antireflective coating is realized.

However, the conventional antireflective coating technology has a drawback in that the antireflective performance is significantly reduced according to the incident angle of the incident wave. Further, recently, although technological advances have been made in the field of moth-eye antireflection technology based on nanotechnology, these technologies are still incapable of realizing perfect antireflection technology.

Meanwhile, the above-described conventional antireflective coating technologies necessarily require at least one layer of a low-refractive-index layer and a high-refractive-index layer, and there are limitations with regard to selection of materials in depositing layers having different refractive indexes. Moreover, since a coating layer is formed based on a vacuum deposition process in all of the conventional antireflective coating technologies, there are difficulties in the deposition process in realizing multilayer coating or antireflective coating having a refractive index gradient the refractive index of which gradually changes across a wide band.

Meanwhile, even in the case of a single layer, it is possible to realize antireflective coating that is functional throughout a wide wavelength band using an oblique incidence deposition method. However, even in this case, there are problems in that a coating layer must be deposited while changing the angle of a substrate and in that precise thickness control is required in processing.

The contents described as the background art are only for understanding the background of the present invention, and should not be taken as corresponding to the related arts already known to those skilled in the art.

SUMMARY

In preferred aspects, provided is an antireflective lens for infrared rays, which may substantially or completely block reflected light that is incident at a high angle in a wide band of a wavelength region of about 8 to 12 μm even when the lens is relatively thin, thereby improving the transmittance of the lens.

In an aspect, provide is an antireflective lens for infrared rays. For example, the antireflective lens may include: a coating layer having an unnatural ultra-high refractive index (4.5 or greater). The coating layer having the unnatural ultra-high refractive index may be required for substantially or completely antireflective coating of optical lenses manufactured based on germanium (Ge), which is a representative material used in thermal-imaging optical systems for detecting far-infrared rays (LWIR, long-wavelength infrared), and is obtained using a meta-material based on gold nanoparticles.

In an aspect, provided is an antireflective lens for infrared rays, which may be produced using a solution process.

In an aspect, provided is an antireflective lens that may be used in an infrared band.

In one preferred aspect, provided is an antireflective lens that may include a lens base part including a base refractive material having a refractive index of about 3.0 or greater and an antireflective coating part formed on the front surface of the lens base part.

The antireflective coating part may preferably include: i) a first layer which is applied on a surface of the lens base part and includes a first refractive material having a refractive index less than the refractive index of the base refractive material, a second layer which is applied on the surface of the first layer and includes a second refractive material having a refractive index greater than the refractive index of the base refractive material, a third layer which is applied on the surface of the second layer and includes a second refractive material having a refractive index corresponding to the refractive index of the first refractive material, and a fourth layer which is applied on the surface of the third layer and includes a fourth refractive material having a refractive index less than the refractive index of the base refractive material and greater than the refractive index of the third refractive material.

The first refractive material and the third refractive material may have, respectively, a refractive index of about 1.3 to 1.7, the second refractive material may have a refractive index of about 4.5 to 4.7, and the fourth refractive material may have a refractive index of about 2.2 to 2.5.

In particular, the refractive index of the base refractive material may be about 4.0, the refractive index of the first refractive material and the refractive index of the third refractive material may be about 1.3, the refractive index of the second refractive material may be about 4.6, and the refractive index of the fourth refractive material may be about 2.3.

The base refractive material may suitably include germanium (Ge) or silicon (Si), the first refractive material and the third refractive material may suitably include one or more selected from the group consisting of $BaF_2$, $CaF_2$, $Al_2O_3$, LiF, $MgF_2$, MgO, and $Y_3Al_5O_{12}$, the second refractive material may suitably include gold nanoparticles, and the fourth refractive material may suitably include one or more selected from the group consisting of ZnS, ZnSe, $LiNbO_3$, $TiO_2$, $YVO_4$, and $ZrO_2$:Y (yttria-stabilized zirconium oxide).

The second refractive material may include the gold nanoparticles synthesized in the form of a cube that is 50 to 100 nm in length on one side.

The lens base part may suitably have a thickness of about 3.5 to 4 mm, the first layer may suitably have a thickness of about 0.405 to 0.495 μm, the second layer may suitably have a thickness of about 0.144 to 0.176 μm, the third layer may suitably have a thickness of about 1.35 to 1.65 μm, and the fourth layer may suitably have a thickness of about 0.198 to 0.242 μm.

The first layer may suitably have a thickness of about 0.45 μm, the second layer may suitably have a thickness of about 0.16 μm, the third layer may suitably have a thickness of about 1.5 μm, and the fourth layer may suitably have a thickness of about 0.22 μm.

The fourth layer may have a front inclined surface sloping from a center point so that a cross-sectional area may become smaller moving toward a front side.

The first layer to the fourth layer of the antireflective coating part may be formed using any one solution process or two or more solution processes among a sol-gel process, a Langmuir-Blodgett process, a convective self-assembly process, and a nanoimprinting process.

The first layer and the third layer of the antireflective coating part may preferably be formed using the sol-gel process, the second layer of the antireflective coating part may preferably be formed using the Langmuir-Blodgett process and the convective self-assembly process, and the fourth layer of the antireflective coating part may suitably have formed using the nanoimprinting process.

In one preferred aspect, provided is a method of producing the antireflective lens as described above. The method may include providing a lens base part comprising a base refractive material having a refractive index of about 3.0 or greater; and forming an antireflective coating part on a front surface of the lens base part.

The antireflective coating part may include: a first layer which is applied on a surface of the lens base part and which comprises a first refractive material having a refractive index less than the refractive index of the base refractive material; a second layer which is applied on a surface of the first layer and which comprises a second refractive material having a refractive index greater than the refractive index of the base refractive material; a third layer which is applied on a surface of the second layer and which includes a third refractive material having a refractive index corresponding to the refractive index of the first refractive material; and a fourth layer which is applied on a surface of the third layer and which includes a fourth refractive material having a refractive index less than the refractive index of the base refractive material and greater than the refractive index of the third refractive material.

The first layer to the fourth layer of the antireflective coating part may suitably be formed using any one solution process or two or more solution processes among a sol-gel process, a Langmuir-Blodgett process, a convective self-assembly process, and a nanoimprinting process. For instance, the first layer and the third layer of the antireflective coating part may be formed using the sol-gel process, the second layer of the antireflective coating part may be formed using the Langmuir-Blodgett process and the convective self-assembly process, and the fourth layer of the antireflective coating part may be formed using the nanoimprinting process.

The first refractive material and the third refractive material may suitably have a refractive index of about 1.3 to 1.7, the second refractive material may suitably have a refractive index of about 4.5 to 4.7, and the fourth refractive layer may suitably have a refractive index of about 2.2 to 2.5. For example, the refractive index of the base refractive material may be about 4.0, the refractive index of the first refractive material and the refractive index of the third refractive material may be about 1.3, the refractive index of the second refractive material may be about 4.6, and the refractive index of the fourth refractive material may be about 2.3.

The base refractive material may suitably include germanium (Ge) or silicon (Si), the first refractive material and the third refractive material may suitably have one or more selected from the group consisting of $BaF_2$, $CaF_2$, $Al_2O_3$, LiF, $MgF_2$, MgO, and $Y_3Al_5O_{12}$, the second refractive material may suitably have gold nanoparticles, and the fourth refractive material comprises one or more selected from the group consisting of ZnS, ZnSe, LiNbO$_3$, TiO$_2$, YVO$_4$, and ZrO$_2$:Y (yttria-stabilized zirconium oxide). In particular, the second refractive material may include the gold nanoparticles synthesized in a form of a cube that is about 50 to 100 nm in length on one side.

Preferably, the lens base part may suitably have a thickness of about 3.5 to 4 mm, the first layer may suitably have a thickness of about 0.405 to 0.495 μm, the second layer may suitably have a thickness of about 0.144 to 0.176 μm, the third layer may suitably have a thickness of about 1.35 to 1.65 μm, and the fourth layer may suitably have a thickness of about 0.198 to 0.242 μm. For example, the first layer may have a thickness of about 0.45 μm, the second layer may have a thickness of about 0.16 μm, the third layer may have a thickness of about 1.5 μm, and the fourth layer may have a thickness of about 0.22 μm.

Preferably, the fourth layer may have a front inclined surface sloping from a center point so that a cross-sectional area becomes smaller moving toward a front side.

According to various aspects of the present invention, since all coating processes may be performed as a solution process, it is possible to improve process convenience compared to conventional deposition process technology.

Moreover, a refractive index may be adjusted using a meta-material including gold nanoparticles instead of a method of combining various materials, so there is little limitation in realizing a refractive index corresponding to an ideal antireflective design.

Further, antireflection capability of the lens may be obtained across a wider region compared to conventional antireflective coating.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawings, in which:

FIG. 2 is a cross-sectional view showing an exemplary antireflective lens for infrared rays according to an exemplary embodiment of the present invention;

FIG. 3A, FIG. 3B, and FIG. 4 are views for explaining a second refractive material forming a second layer of an antireflective lens for infrared rays according to an exemplary embodiment of the present invention;

DESCRIPTION OF THE PREFERRED EMBODIMENTS

Figure 1:
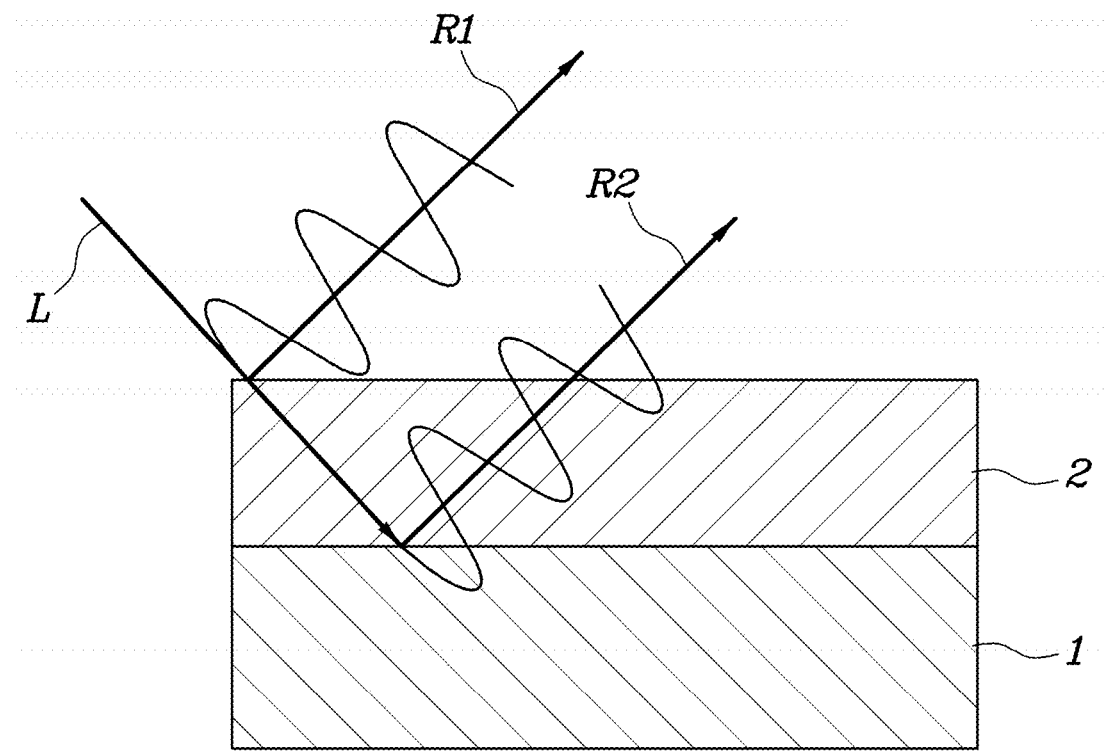
FIG. 1 shows a principle of antireflection in the related art.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof. Further, when a portion such as a layer, a film, a region, or a plate is referred to as being "above" the other portion, it may be not only "right above" the other portion, or but also there may be another portion in the middle. On the contrary, when a portion such as a layer, a film, a region, or a plate is referred to as being "under" the other portion, it may be not only "right under" the other portion, or but also there may be another portion in the middle.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

Hereinafter, exemplary embodiments of the present invention will be described in detail with reference to the accompanying drawings. However, the present invention is not limited to the embodiments disclosed below, but will be implemented in various different forms, and the present embodiments are merely provided to complete the disclosure of the present invention and to fully inform those skilled in the art of the scope of the invention. Like reference numerals refer to like elements in the drawings.

FIG. 2 is a cross-sectional view showing an exemplary antireflective lens for infrared rays according to an exemplary embodiment of the present invention.

As shown in FIG. 2, the antireflective lens for infrared rays may be used in an infrared band, and may include a lens base part 100 including a base refractive material having a high refractive index of about 3.0 or greater, and an antireflective coating part 200 formed on the front surface of the lens base part 100.

The lens base part 100 may be formed using a base refractive material that has a high refractive index of about 3.0 or greater typically used to manufacture lenses of thermal-imaging optical systems for detecting far-infrared rays (LWIR, long-wavelength infrared). For example, the lens base part 100 may suitably be formed using germanium (Ge) or silicon (Si). Preferably, the lens base part 100 may be formed using germanium (Ge) so as to have a refractive index of about 4.0.

The thickness of the lens base part 100 may suitably from about 3.5 to 4 about mm.

The antireflective coating part 200 may be formed in multiple layers on the front surface of the lens base part 100 so as to induce destructive interference of the reflection wavelength of the light incident on the lens base part 100, thereby realizing antireflection.

The antireflective coating part 200 may be formed by layering materials having different refractive indexes and a meta-material having an unnatural ultra-high refractive index in order to completely block light reflection for far-infrared rays in a wavelength range of about 8 to 12 μm.

For example, the antireflective coating part 200 may include a first layer 210 which is applied on the surface of the lens base part 100 and includes a first refractive material having a refractive index less than the refractive index of the base refractive material in the lens base part 100, a second layer 220 which is applied on the surface of the first layer 210 and includes a second refractive material (or "meta-material") having a refractive index greater than the refractive index of the base refractive material of the lens base part 100, a third layer 230 which is applied on the surface of the second layer 220 and includes a third refractive material having a refractive index corresponding to the refractive index of the first refractive material in the first layer 210, and a fourth layer 240 which is applied on the surface of the third layer 230 and includes a fourth refractive material having a refractive index less than the refractive index of the base refractive material and greater than the refractive index of the third refractive material in the third layer 230.

The first layer 210, the third layer 230, and the fourth layer 240 may have a relatively low refractive index and include a material (e.g. first refractive material, third refractive material, fourth refractive material) having a low refractive index. The second layer 220 may have a relatively high refractive index and includes the second refractive material (meta-material) including gold nanoparticles. The first refractive material in the first layer 210 and the third refractive material in the third layer 230 may have a refractive index of about 1.3 to 1.7. For example, the first and third refractive materials may include one or more selected from the group consisting of $BaF_2$, $CaF_2$, $Al_2O_3$, LiF, $MgF_2$, MgO, and $Y_3Al_5O_{12}$ to form the first layer 210 and the third layer 230. Therefore, for example, any one layer of the first layer 210 and the third layer 230 may include $BaF_2$, and the other layer may include $CaF_2$. Further, both the first layer 210 and the third layer 230 may be formed using the same material, namely, $BaF_2$. Accordingly, both the first layer 210 and the third layer 230 may include $BaF_2$ to thus form a layer having a refractive index of about 1.3.

The reason why the first layer 210 and the third layer 230 include $BaF_2$, $CaF_2$, $Al_2O_3$, LiF, $MgF_2$, MgO, or $Y_3Al_5O_{12}$ is that the suggested materials absorb little light in an infrared region and that the materials are fluoride materials capable of being simply applied using a sol-gel process, which is one of the solution processes. For example, a polymer (PDMS, PMMA, and the like), which is a general-purpose material capable of being applied in the solution process, absorption may be very strong in the infrared region due to bonding of specific molecules such that the polymer may not be applied to the material forming the first layer 210 and the third layer 230.

In addition, the fourth layer 240 may include the fourth refractive material having a refractive index relatively greater than the refractive indexes of the first refractive material in the first layer 210 and the third refractive material in the third layer 230. The fourth layer 240 may suitably include the fourth refractive material having a refractive index of about 2.2 to 2.5. For example, the fourth refractive material in the fourth layer 240 may include one or more selected from the group consisting of ZnS, ZnSe, $LiNbO_3$, $TiO_2$, $YVO_4$, and $ZrO_2$:Y (yttria-stabilized zirconium oxide). Preferably, the fourth layer 240 may include ZnS to form a layer having a refractive index of 2.3.

The reason why the fourth layer 240 includes ZnS, ZnSe, $LiNbO_3$, $TiO_2$, $YVO_4$, or $ZrO_2$:Y (yttria-stabilized zirconium oxide) is that the refractive index required for the outermost layer is approximately 2.3 in the design of the antireflective coating part 200 according to the refractive index of the lens base part 100. The fourth layer 240 may be formed using a nanoimprinting process, which is one of the solution processes.

Meanwhile, the second layer 220 may include a second refractive material having a refractive index relatively greater than the refractive indexes of the first refractive material in the first layer 210, the third layer 230, and the fourth refractive material in the fourth layer 240. Preferably, the second refractive material in the second layer 220 may have a refractive index greater than the refractive index of the base refractive material in the lens base part 100 despite having a relatively small thickness. Preferably, the second layer 220 may be formed using a meta-material including on gold nanoparticles 221 so that the second layer 220 may be formed as a coating layer which has an unnatural ultra-high refractive index of about 4.5 to 4.7 and which absorbs little light. Preferably, the refractive index of the second refractive material in the second layer 220 be 4.6.

The second layer 220 may include the second refractive material or the meta-material obtained by flat assembling gold nanoparticles 221 synthesized in the form of a cube that is about 50 to 100 nm in length on one side.

The term "meta-material" as used herein refers to a material obtained by artificially and periodically arranging meta-atoms, designed using a metal or dielectric material manufactured so as to have a size that is even smaller than the wavelength of light in order to realize characteristics that do not exist in nature. The meta-material may be formed to have a size of $\frac{1}{10}$ to $\frac{1}{5}$ of the wavelength.

Since the refractive index of the second layer 220 must have a high refractive index value of about 4.6, which is not obtainable using natural materials, the second layer 220 may be formed using the meta-material.

Figure 3B:
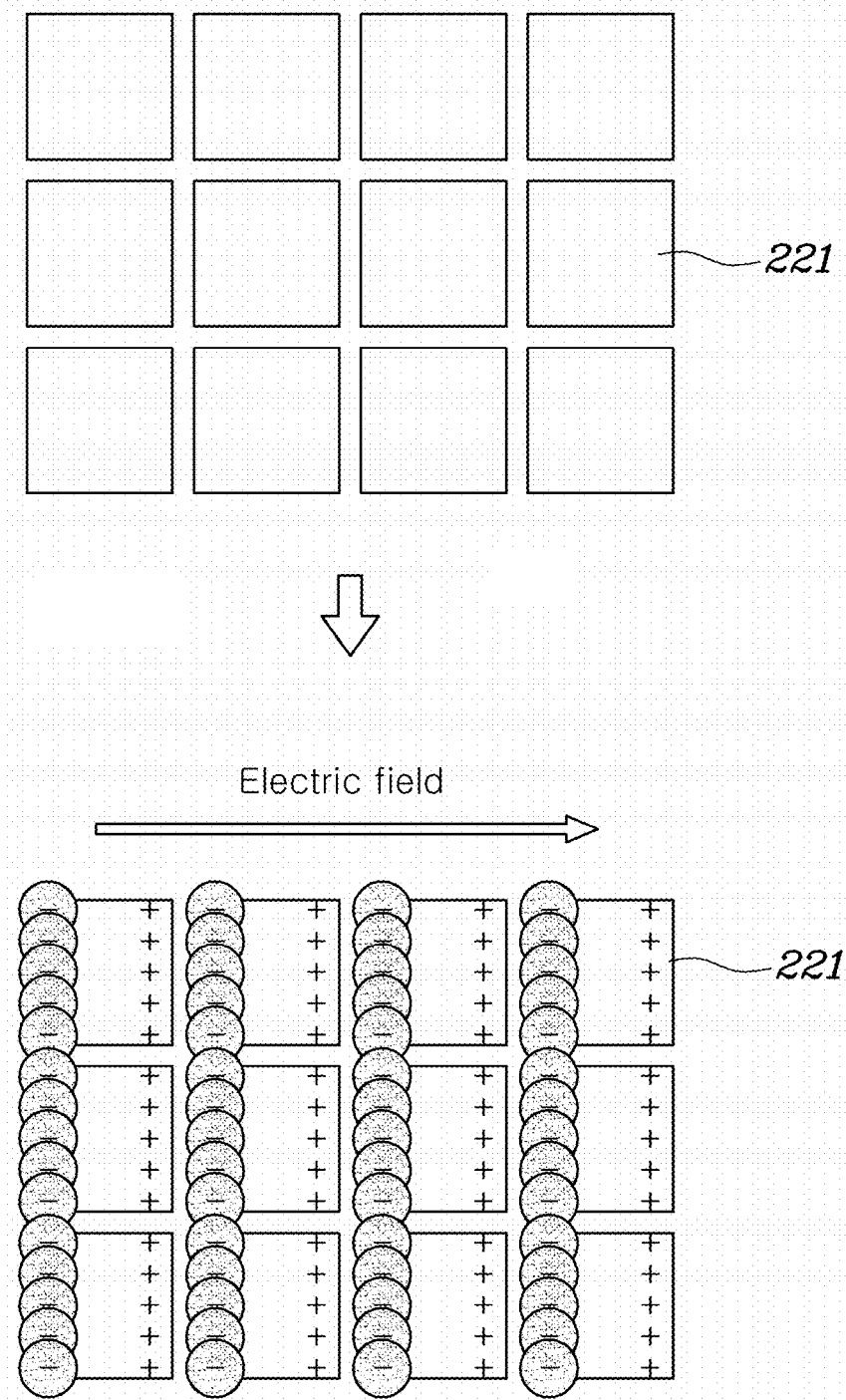
Figure 4:
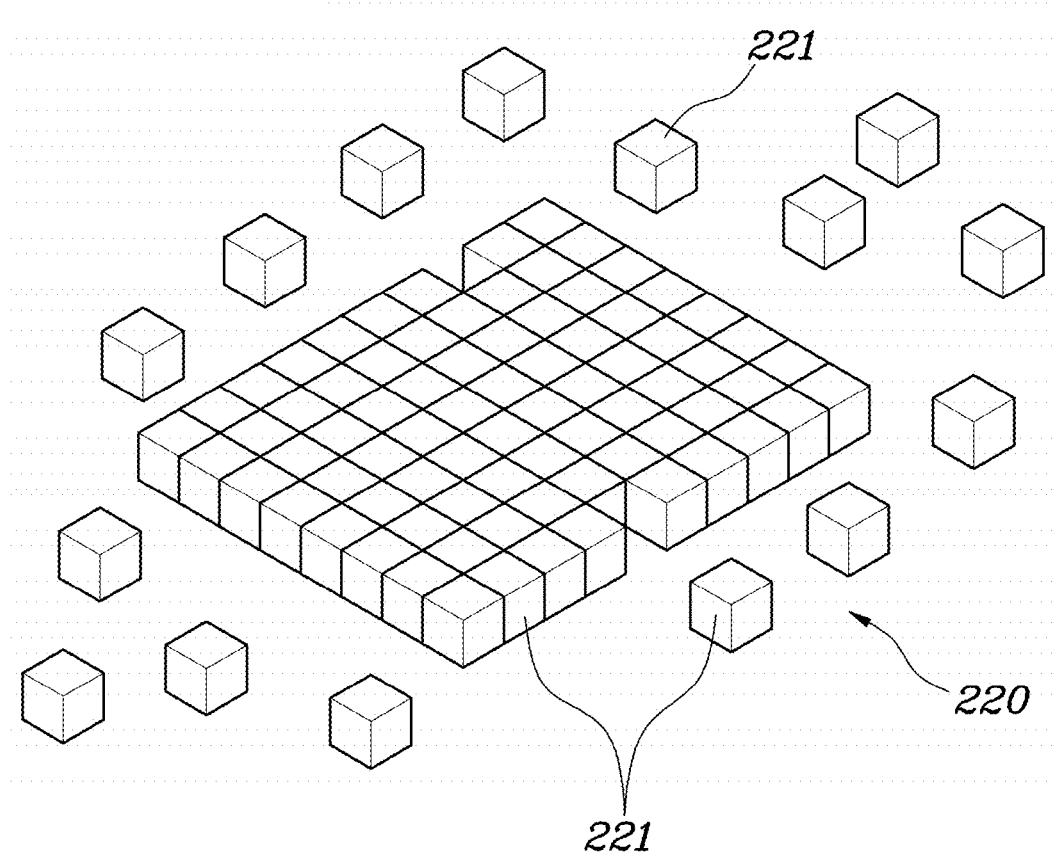

The method of forming the second layer 220 will be described with reference to the drawings. FIG. 3A shows a phenomenon in which polarization occurs in a natural material, FIG. 3B shows a phenomenon in which polarization occurs in an exemplary meta-material, and FIG. 4 shows a phenomenon in which meta-materials are assembled flat by Langmuir-Blodgett and/or convective self-assembly.

The structure of the meta-material forming the second layer 220 may increase the dielectric permittivity value as much as possible based on the following dielectric permittivity equation.

$$\varepsilon = 1 + P/(\varepsilon_0 \times E) \quad \text{[Dielectric permittivity equation]}$$

($\varepsilon$: Dielectric permittivity, P: Polarization, $\varepsilon_0$: Dielectric permittivity in a vacuum, E: Electric field)

The dielectric permittivity ($\varepsilon$) is a physical quantity that indicates the magnitude of polarization when an electric field is applied to a predetermined material. In natural materials, the degree of polarization is determined by the atoms or molecules that constitute the actual material. However, in the present invention, the concept of a meta-material is introduced to use gold nanoparticles as artificial atoms (meta-atoms), and thereby it is possible to unnaturally maximize the polarization, thereby greatly increasing the dielectric permittivity.

As shown in FIG. 3A, with respect to the dielectric permittivity of a natural material existing in nature, when an electric field is applied, electrons that exist in atoms or molecules constituting the material move in the opposite direction of the electric field, which causes polarization. The dielectric permittivity is an indicator of the degree of polarization of the atoms or molecules constituting the material in the material when an electric field is applied thereto.

However, in the case of a meta-material, as shown in FIG. 3B when the meta-atoms constituting the meta-material are gold nanoparticles 221, the surfaces of the gold nanoparticles 221 facing each other act as capacitors, which causes polarization much stronger than the polarization of ordinary atoms or molecules.

The second layer 220 is designed using the principle whereby the meta-material causes strong polarization. The refractive index is the value of the square root of the product of the dielectric permittivity and the magnetic permeability. Since the effect of the magnetic permeability is not great, the result is that the refractive index of the meta-material designed with such a structure has a very high refractive index value that is not obtainable in nature.

The meta-material may be manufactured by synthesizing the gold nanoparticles 221 in the form of a cube and then assembling the gold nanoparticles 221.

In the method of synthesizing the gold nanoparticles 221 in the form of a cube, very uniform gold nanorods may be primarily synthesized, and then the gold nanorods may be etched using gold ions to thus obtain a spherical single crystal gold nanoseed. The seed may be used to grow polyhedral gold nanoparticles with pointed ends (concave rhombic dodecahedron), and further etching is performed using gold ions. Growth and etching processes may be repeated to obtain a very uniform spherical seed, and cube (regular hexahedron)-shaped particles are grown based thereon, thereby synthesizing very uniform cube-shaped gold nanoparticles 221.

The gold nanoparticles 221 may be synthesized such that the length on one side has a size of about 50 to 100 nm.

In addition, after the gold nanoparticles 221 synthesized in the form of a cube having a length of about 50 to 100 nm on one side are prepared, the gold nanoparticles 221 may be assembled flat. For example, the meta-material layer including the gold nanoparticles 221 may be manufactured by performing assembly using a water-oil interface assembly process.

The prepared gold nanoparticles 221 may be dispersed in an aqueous solution. In addition, hexane may be added to the gold nanoparticle aqueous solution on which the gold nanoparticles 221 may be sprayed, thus forming a water-oil layer. In this case, when ethanol is injected into the aqueous solution layer in which the gold nanoparticles 221 are dispersed, the surface charge of the gold nanoparticles 221 may be weakened and becomes unstable. For this reason, the gold nanoparticles 221 may be located at a water-hexane interface having relatively high energy so as to become thermodynamically stable. When ethanol is injected at a predetermined concentration, all of the gold nanoparticles 221 in the aqueous solution layer may be located at the water-hexane interface, and the number of gold nanoparticles may be increased, whereby the gold nanoparticles are very densely assembled (Langmuir-Blodgett and/or convective assembly). In addition, the densely assembled gold nanoparticles 221 may be moved onto the lens base part 100, thereby manufacturing a meta-material layer.

The meta-material layer manufactured using the above-described method may be obtained by assembling the gold nanoparticles 221 in the form of a cube using the Langmuir-Blodgett process shown in FIG. 4 so as to form a flat layer. The assembled meta-material layer may confine more light (electromagnetic waves) between the gold nanoparticles 221, thus dramatically increasing the refractive index.

Meanwhile, the refractive index of the meta-material layer may be freely adjusted depending on the space share of the gold nanoparticles 221. For example, the concentration of the gold nanoparticles 221 dispersed in a gold nanoparticle dispersion solution may be adjusted so as to realize a refractive index in the range of about 1.5 to 5.0. In the present embodiment, the concentration of the gold nanoparticles 221 may be adjusted so as to correspond to the refractive index of the lens base part 100 including germanium (Ge), thereby forming a second layer having a refractive index of about 4.6.

Figure 5:
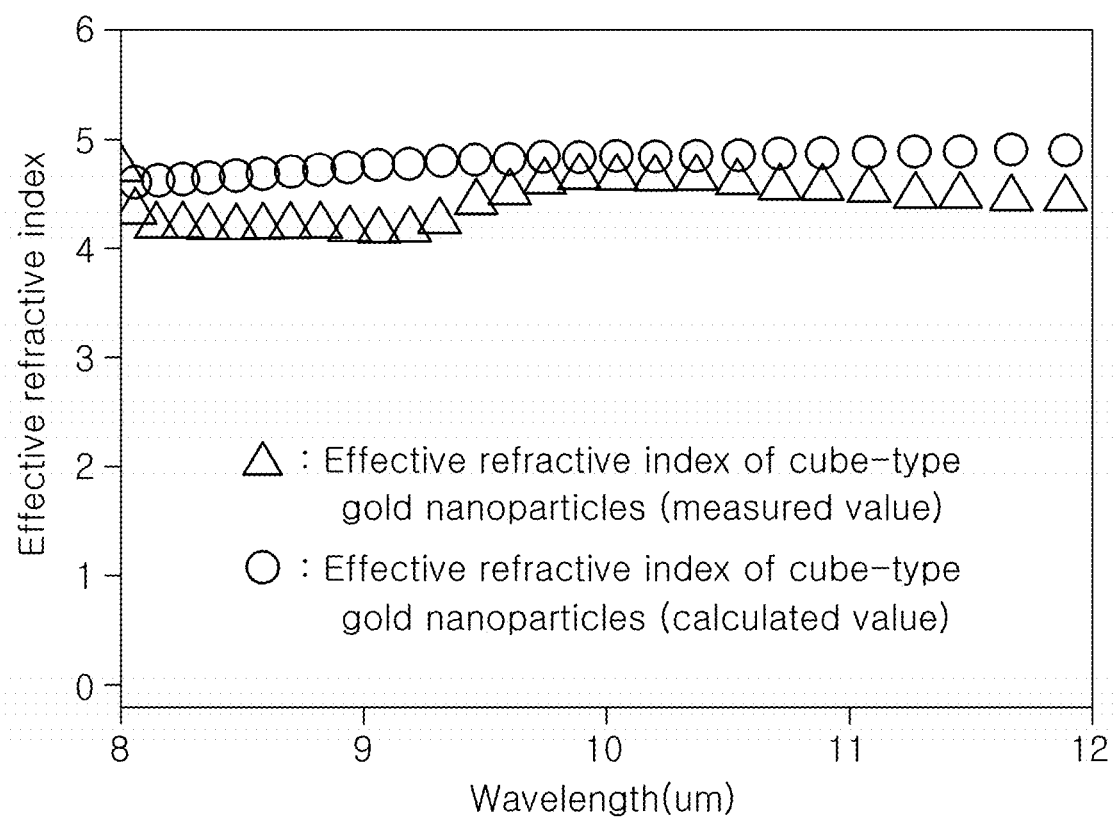
FIG. 5 shows the result obtained by comparing the measured value and the calculated value of the effective refractive index of exemplary cube-type gold nanoparticles.

FIG. 5 shows the result obtained by comparing the measured value and the calculated value of the effective refractive index of cube-type gold nanoparticles. According to FIG. 5, the value obtained by calculating the effective refractive index of the meta-material may be in a band of 8 to 12 μm when the cube-type gold nanoparticles are densely gathered, and the refractive index may be actually measured using a spectroscopic ellipsometry method. As shown in FIG. 5, the calculated value obtained by calculating the effective refractive index of the meta-material was in a band of about 8 to 12 μm when the cube-type gold nanoparticles were densely gathered and the measured value actually measured using the spectroscopic ellipsometry method were about 4.6 on average.

Therefore, when the second layer is formed using the above-described meta-material, a layer having a refractive index of about 4.6 may be formed.

Meanwhile, unlike the first layer 210, the second layer 220, and the third layer 230, which are formed flat, the fourth layer 240 preferably may have a front inclined surface 241 sloping from a center point so that the cross-sectional area thereof becomes smaller moving toward the front side (the upper direction of FIG. 2). Therefore, the fourth layer 240 may be obtained in the form of a periodically arranged structure in which the width thereof becomes narrower moving away from the third layer 230.

The reason why the width of the fourth layer 240 becomes narrower moving away from the third layer 230 is that, when the fourth layer 240, forming the outermost layer, is flat, the transmittance may be reduced when the incident angle is high, whereby the antireflective effect may be realized only in a narrow band.

Figure 6A:
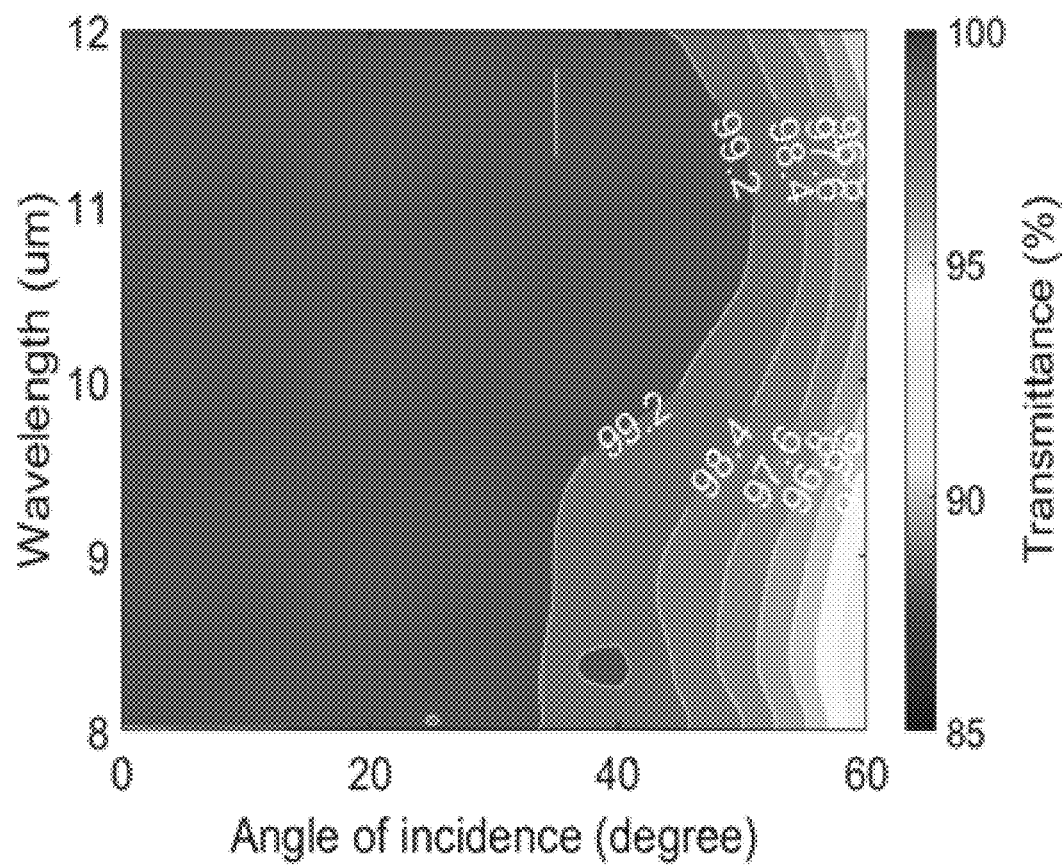
FIGS. 6A and 6B show the transmittances according to an exemplary structure of an exemplary fourth layer according to an exemplary embodiment of the present invention.
Figure 6B:
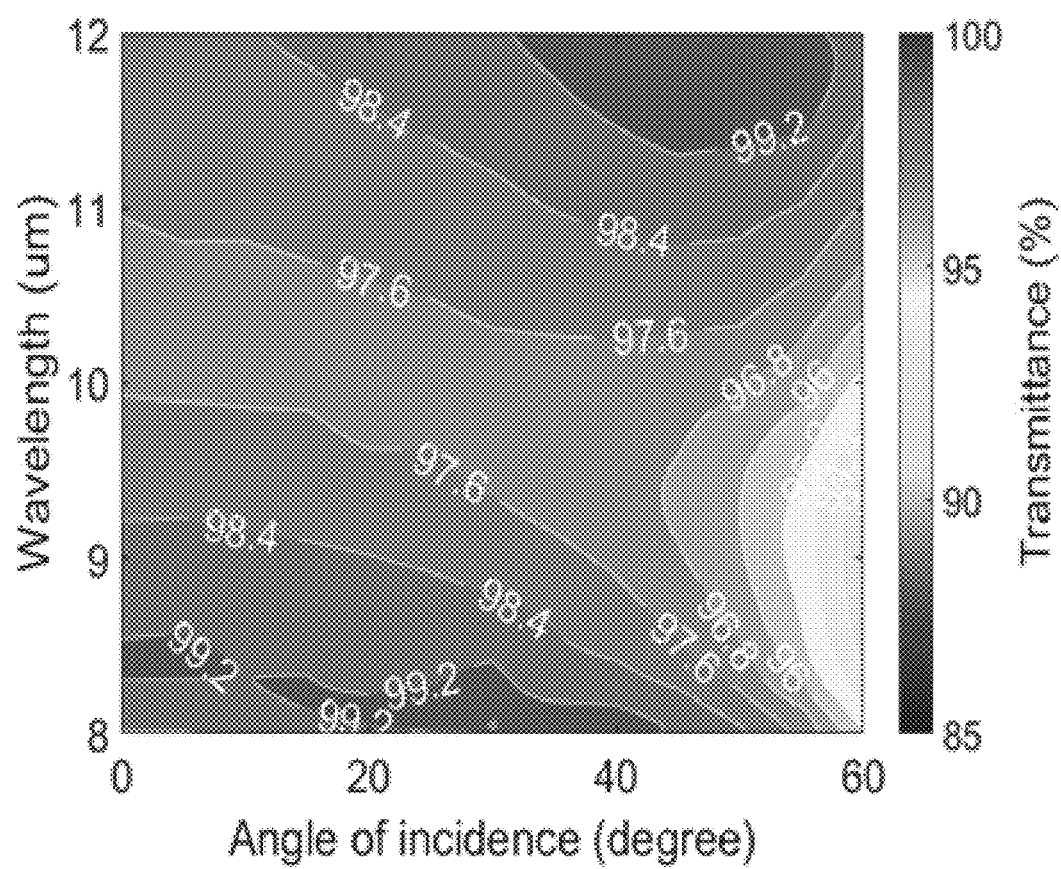

FIGS. 6A and 6B show the transmittance according to the structure of the fourth layer. FIG. 6A shows the transmittance when the inclined surface is formed on the fourth layer according to an exemplary embodiment of the present invention, and FIG. 6B is a view showing the transmittance when the fourth layer is formed flat.

As shown in FIG. 6A, when the surface of the fourth layer, which is the outermost surface of the antireflective coating part, is formed as an inclined surface, the effective refractive index thereof may be relatively uniformly increased even at various incident angles.

In contrast, as shown in FIG. 6B, when the surface of the fourth layer, which is the outermost surface of the antireflective coating part, is flat, the transmittance tends to be reduced as the incident angle may be increased. As such, the antireflective effect may be obtained only in a narrow band.

The reason why the transmittance depends on the surface shape of the fourth layer as described above is as follows. When the inclined surface is formed on the surface of the fourth layer according to an exemplary embodiment of the present embodiment, the effective refractive index may be increased as the incidence angle is increased, but when the surface of the fourth layer is flat, it is impossible to obtain the effect of increasing the effective refractive index as the incident angle is increased.

The thickness of the antireflective coating part may be of about 2.097 to 2.563 µm, or particularly of about 2.33 µm. Preferably, the thickness of the first layer may be of about 0.405 to 0.495 µm, the thickness of the second layer may be of about 0.144 to 0.176 µm, the thickness of the third layer may be of about 1.35 to 1.65 µm, and the thickness of the fourth layer may be of about 0.198 to 0.242 µm. Particularly, the thickness of the first layer may be about 0.45 µm, the thickness of the second layer may be about 0.16 µm, the thickness of the third layer may be about 1.5 µm, and the thickness of the fourth layer may be about 0.22 µm.

According to various exemplary embodiments in the present embodiment, only when the antireflective coating part is formed by layering the above-described first layer to the fourth layer in the order suggested can the antireflective effect be expected. An experiment was performed to determine this effect, and the results are shown in FIGS. 7A to 7D.

FIGS. 7A to 7D are views showing the transmittances according to an Example and Comparative Examples.

Figure 7A:
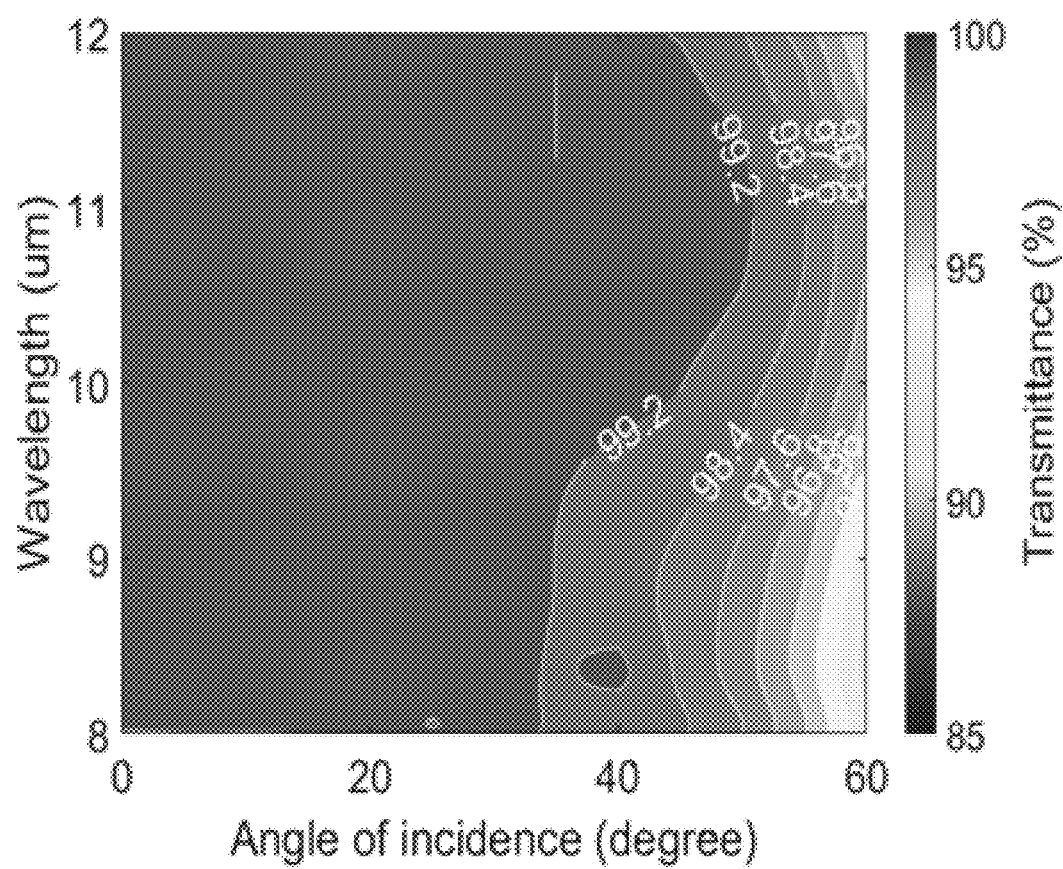
FIGS. 7A to 7D show the transmittances according to an Example and Comparative Examples.
Figure 7B:
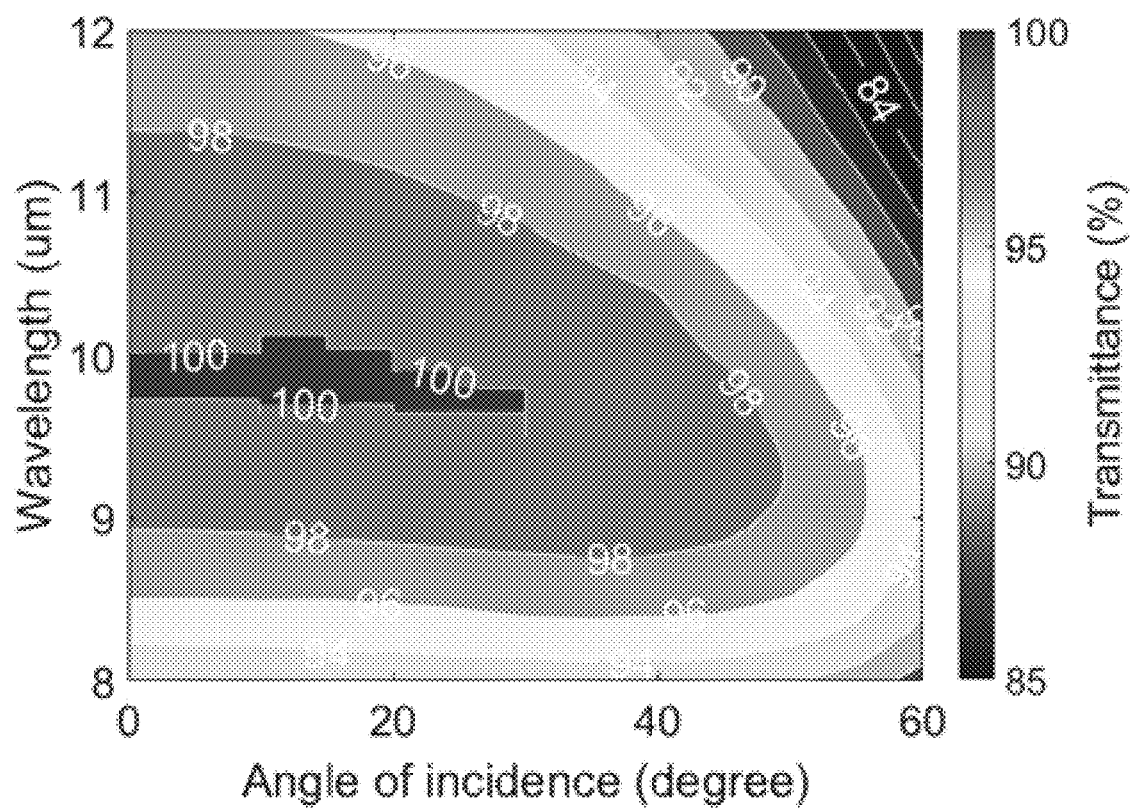
Figure 7C:
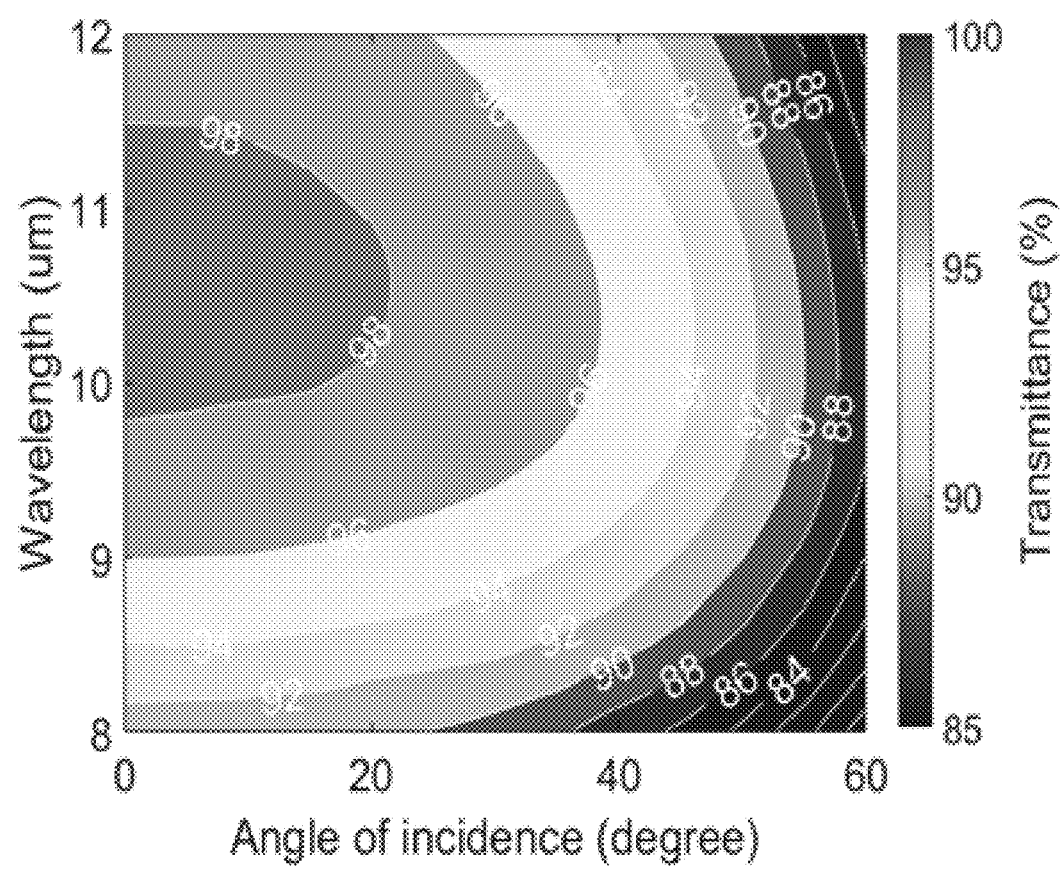
Figure 7D:
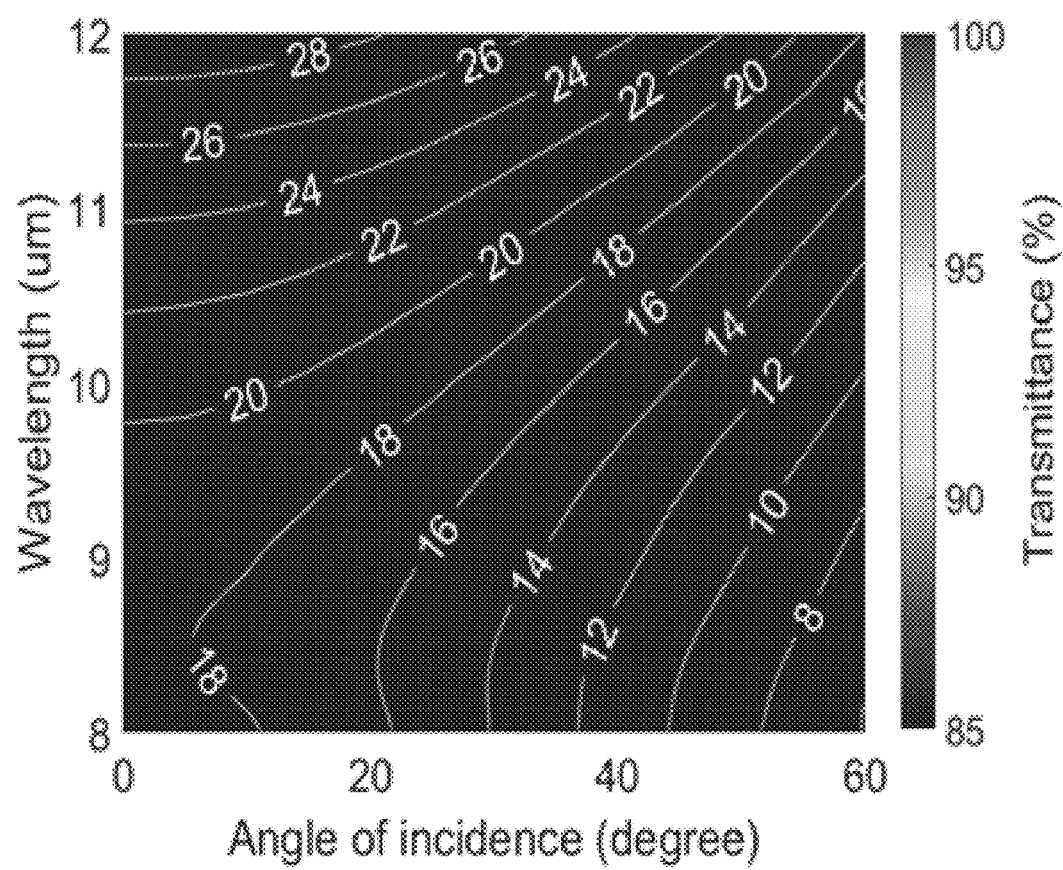

FIG. 7A shows the transmittance of an antireflective coating part manufactured according to the Example of the present invention, FIG. 7B shows the transmittance of a coating layer (Comparative Example 1) to which a conventional general QAR (quarter-wave antireflection) coating is applied, FIG. 7C shows the transmittance of an antireflective coating part (Comparative Example 2) in which only first to third layers are formed without a fourth layer in the present Example, and FIG. 7D shows the transmittance of an antireflective coating part (Comparative Example 3) having a structure in which the order of a second layer and a fourth layer is changed in the present Example.

As shown in FIG. 7A, the antireflective coating part manufactured according to the Example of the present invention ensured the antireflective effect in a broad wavelength band even when the incident angle is changed.

In contrast, as shown in FIG. 7B, Comparative Example 1 showed high transmittance only in a specific wavelength band, indicating that the antireflective effect was realized only in a narrow wavelength band.

In addition, as shown in FIG. 7C, in Comparative Example 2, the antireflective effect was reduced overall in a broad wavelength band compared to FIG. 7A (Example).

Further, as shown in FIG. 7D, in Comparative Example 3, the antireflective effect was significantly reduced overall in a broad wavelength band compared to FIG. 7A (Example).

Therefore, the antireflective effect may be realized in a broad wavelength band by maintaining the layering order and the number of the first to fourth layers forming the antireflective coating part suggested by the present invention.

The first layer 210 to the fourth layer 240 forming the antireflective coating part 100 may be sequentially layered one by one, but the present invention is not limited thereto. In order to increase antireflective efficiency, the first layer 210 to the third layer 230 may be repeatedly formed by layering between the lens base part 100 and the fourth layer 240 in the state in which the fourth layer 240 is fixedly disposed at the forefront.

For example, the first layer 210, the second layer 220, the third layer 230, the first layer 210, the second layer 220, and the third layer 230 may be sequentially layered on the surface of the lens base part 100 as a basis, and the fourth layer 240 may be formed on the surface of the outermost third layer 230. Of course, the combination of the first layer 210, the second layer 220, and the third layer 230 may be repeatedly layered two or more times.

Although the present invention has been described with reference to the accompanying drawings and exemplary embodiments described above, the present invention is not limited thereto, but is defined by the appended claims. Accordingly, one of ordinary skill in the art may variously transform and modify the present invention without departing from the technical spirit of the appended claims.

What is claimed is:

1. An antireflective lens for infrared rays used in an infrared band, comprising:
   a lens base part comprising a base refractive material having a refractive index of about 3.0 or greater; and
   an antireflective coating part formed on a front surface of the lens base part,
   wherein the antireflective coating part comprises:
     a first layer which is applied on a surface of the lens base part and which comprises a first refractive material having a refractive index less than the refractive index of the base refractive material;
     a second layer which is applied on a surface of the first layer and which comprises a second refractive material having a refractive index greater than the refractive index of the base refractive material;
     a third layer which is applied on a surface of the second layer and which includes a third refractive material having a refractive index corresponding to the refractive index of the first refractive material; and
     a fourth layer which is applied on a surface of the third layer and which includes a fourth refractive material having a refractive index less than the refractive index of the base refractive material and greater than the refractive index of the third refractive material;
   wherein the first refractive material and the third refractive material have a refractive index of about 1.3 to 1.7, the second refractive material has a refractive index of about 4.5 to 4.7, and the fourth refractive layer has a refractive index of about 2.2 to 2.5.

2. The antireflective lens for infrared rays of claim 1, wherein the refractive index of the base refractive material is about 4.0, the refractive index of the first refractive material and the refractive index of the third refractive material are about 1.3, the refractive index of the second refractive material is about 4.6, and the refractive index of the fourth refractive material is about 2.3.

3. The antireflective lens for infrared rays of claim 1, wherein the fourth layer has a front inclined surface sloping from a center point so that a cross-sectional area becomes smaller moving toward a front side.

4. The antireflective lens for infrared rays of claim 1, wherein the base refractive material comprises germanium (Ge) or silicon (Si), the first refractive material and the third refractive material comprise one or more selected from the group consisting of $BaF_2$, $CaF_2$, $Al_2O_3$, LiF, $MgF_2$, MgO, and $Y_3Al_5O_{12}$, the second refractive material (meta-material) comprise gold nanoparticles, and the fourth refractive material comprises one or more selected from the group consisting of ZnS, ZnSe, $LiNbO_3$, $TiO_2$, $YVO_4$, and $ZrO_2$:Y (yttria-stabilized zirconium oxide).

5. The antireflective lens for infrared rays of claim 4, wherein the second refractive material comprises the gold nanoparticles synthesized in a form of a cube that is about 50 to 100 nm in length on one side.

6. The antireflective lens for infrared rays of claim 1, wherein the lens base part has a thickness of about 3.5 to 4 mm, the first layer has a thickness of about 0.405 to 0.495 μm, the second layer has a thickness of about 0.144 to 0.176 μm, the third layer has a thickness of about 1.35 to 1.65 μm, and the fourth layer has a thickness of about 0.198 to 0.242 μm.

7. The antireflective lens for infrared rays of claim 6, wherein the first layer has a thickness of about 0.45 μm, the second layer has a thickness of about 0.16 μm, the third layer has a thickness of about 1.5 μm, and the fourth layer has a thickness of about 0.22 μm.

8. The antireflective lens for infrared rays of claim 1, wherein the first layer to the fourth layer of the antireflective coating part are formed using any one solution process or two or more solution processes among a sol-gel process, a Langmuir-Blodgett process, a convective self-assembly process, and a nanoimprinting process.

9. The antireflective lens for infrared rays of claim 8, wherein the first layer and the third layer of the antireflective coating part are formed using the sol-gel process, the second layer of the antireflective coating part is formed using the Langmuir-Blodgett process and the convective self-assembly process, and the fourth layer of the antireflective coating part is formed using the nanoimprinting process.

10. A method of producing an antireflective lens, comprising:
providing a lens base part comprising a base refractive material having a refractive index of about 3.0 or greater; and
forming an antireflective coating part on a front surface of the lens base part, wherein the antireflective coating part comprises:
a first layer which is applied on a surface of the lens base part and which comprises a first refractive material having a refractive index less than the refractive index of the base refractive material;
a second layer which is applied on a surface of the first layer and which comprises a second refractive material having a refractive index greater than the refractive index of the base refractive material;
a third layer which is applied on a surface of the second layer and which includes a third refractive material having a refractive index corresponding to the refractive index of the first refractive material; and
a fourth layer which is applied on a surface of the third layer and which includes a fourth refractive material having a refractive index less than the refractive index of the base refractive material and greater than the refractive index of the third refractive material;
wherein the first refractive material and the third refractive material have a refractive index of about 1.3 to 1.7, the second refractive material has a refractive index of about 4.5 to 4.7, and the fourth refractive layer has a refractive index of about 2.2 to 2.5.

11. The method of claim 10, wherein the refractive index of the base refractive material is about 4.0, the refractive index of the first refractive material and the refractive index of the third refractive material are about 1.3, the refractive index of the second refractive material is about 4.6, and the refractive index of the fourth refractive material is about 2.3.

12. The method of claim 10, wherein the fourth layer has a front inclined surface sloping from a center point so that a cross-sectional area becomes smaller moving toward a front side.

13. The method of claim 10, wherein the first layer to the fourth layer of the antireflective coating part are formed using any one solution process or two or more solution processes among a sol-gel process, a Langmuir-Blodgett process, a convective self-assembly process, and a nanoimprinting process.

14. The method of claim 13, wherein the first layer and the third layer of the antireflective coating part are formed using the sol-gel process, the second layer of the antireflective coating part is formed using the Langmuir-Blodgett process and the convective self-assembly process, and the fourth layer of the antireflective coating part is formed using the nanoimprinting process.

15. The method of claim 10, wherein the base refractive material comprises germanium (Ge) or silicon (Si), the first refractive material and the third refractive material comprise one or more selected from the group consisting of $BaF_2$, $CaF_2$, $Al_2O_3$, LiF, $MgF_2$, MgO, and $Y_3Al_5O_{12}$, the second refractive material comprises gold nanoparticles, and the fourth refractive material comprises one or more selected from the group consisting of ZnS, ZnSe, $LiNbO_3$, $TiO_2$, $YVO_4$, and $ZrO_2$:Y (yttria-stabilized zirconium oxide).

16. The method of claim 15, wherein the second refractive material comprises the gold nanoparticles synthesized in a form of a cube that is about 50 to 100 nm in length on one side.

17. The method of claim 10, wherein the lens base part has a thickness of about 3.5 to 4 mm, the first layer has a thickness of about 0.405 to 0.495 μm, the second layer has a thickness of about 0.144 to 0.176 μm, the third layer has a thickness of about 1.35 to 1.65 μm, and the fourth layer has a thickness of about 0.198 to 0.242 μm.

18. The method of claim 17, wherein the first layer has a thickness of about 0.45 μm, the second layer has a thickness of about 0.16 μm, the third layer has a thickness of about 1.5 μm, and the fourth layer has a thickness of about 0.22 μm.

\* \* \* \* \*